Figure 1:
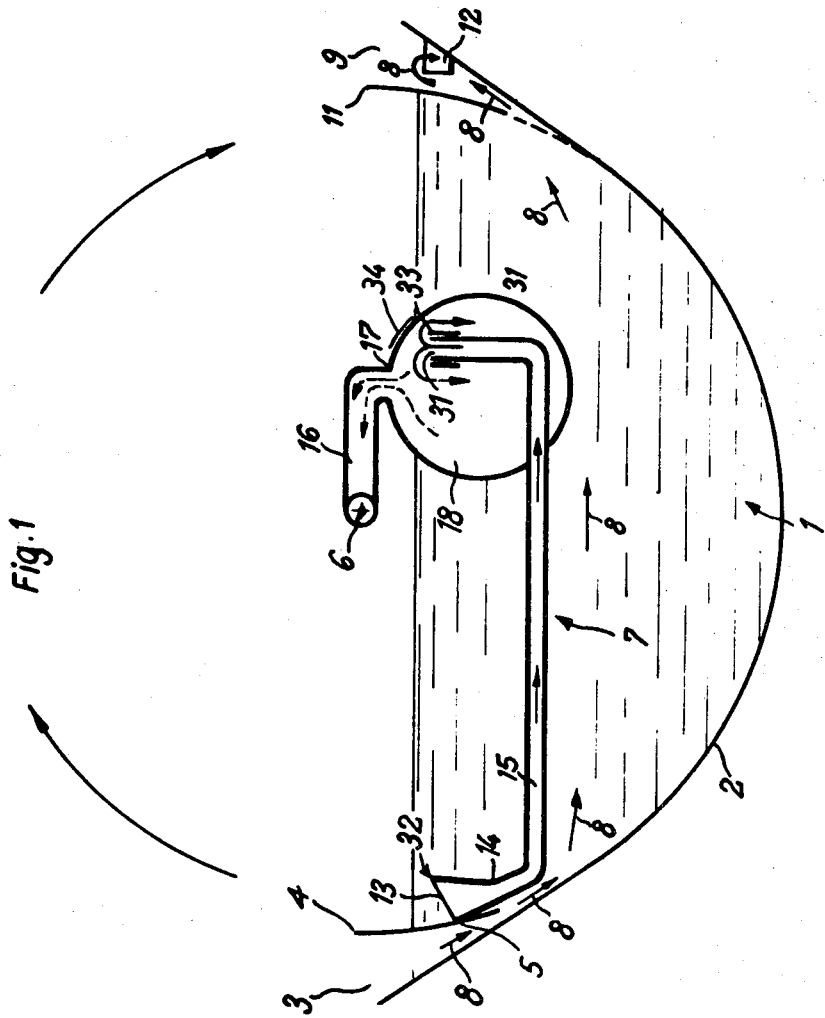

United States Patent

Stengelin

[15] 3,687,299
[45] Aug. 29, 1972

[54] TANK FOR THE PURIFICATION OF WASTE WATER

[72] Inventor: Joh. Conrad Stengelin, Obere Vorstadt 21, Tuttlingen, Germany

[22] Filed: May 18, 1971

[21] Appl. No.: 144,619

[52] U.S. Cl. ................................................210/523
[51] Int. Cl. ............................................B01d 21/24
[58] Field of Search..............................210/523, 525

[56] References Cited

UNITED STATES PATENTS 1,986,573    1/1935    Hardinge ...............210/525 X

*Primary Examiner*—Samih H. Zaharna
*Assistant Examiner*—Frederick F. Calvetti
*Attorney*—Craig, Antonelli and Hill

[57] ABSTRACT

A tank for water purification with a sludge remover rotatable within the same to scoop up sludge from the tank bottom; the sludge remover thereby includes a scoop connected with a suction pipe leading to a discharge conduit in such a manner that the sludge scooped up by the scoop is conveyed to its ultimate destination for further treatment by suction effect.

23 Claims, 2 Drawing Figures

TANK FOR THE PURIFICATION OF WASTE WATER

This invention relates to a tank for the purification of waste water with a sludge remover which is slowly rotatable about an axis disposed above the waste water level and is guided along the semicircularly shaped tank bottom.

The tanks of this type known heretofore, in which scoop buckets of the sludge removers empty out after reaching a certain height, exhibited the disadvantage that the sludge or mud sediment removed from the bottom of the tank was again flushed off from the remover during the emergence of the remover out of the water surface due to the eddy currents produced thereby, and settled again on the bottom of the tank.

It is the object of this invention to avoid these disadvantages and to ensure that in fact all of the sediment such as sludge lifted from the tank bottom by the remover is carried away.

In order to attain this object, the present invention conceived the idea to convey the entire thus-lifted sludge by suction effect to its further destination.

The underlying problems are solved by this invention in that the sludge remover includes a scoop bucket adapted to the width of the tank; a suction pipe is connected to the bottom of this scoop bucket, i.e., to the face of the scoop bucket disposed on the bottom during emerging, at the lowest point thereof, which pipe simultaneously serves as support means; sediments such as sludge or mud are conveyed during the rotary movement of the scoop bucket through this pipe to a drainage duct lying above the waste water level.

In a further development of the invention, the drainage duct or discharge channel may extend coaxially with respect to the axis of rotation of the sludge remover, and the suction pipe may terminate in a collecting chamber which, during the emergence of the scoop bucket, is disposed substantially below the waste water level; a connecting pipe is connected to the collecting chamber at the point thereof which is highest in such collecting chamber at the instant of emergence, which connecting pipe, due to its special construction, simultaneously constitutes the rotary shaft of the sludge remover. The parts of the connecting pipe forming the rotary shaft may be suitably coupled, on the one hand, to a drive means, for example, in an overhung manner to an electric motor or to a reduction gear unit and, on the other hand, may be supported in the discharge channel which is preferably constructed to be of tubular shape. It is furthermore advantageous if the mouth of the suction pipe terminating in the collecting chamber is positioned, during the emerging of the scoop bucket, somewhat below the level of the latter, and that the height of the mouth can be adjusted. This makes it possible to control the start of the siphoning operation, for this operation should begin shortly prior to the emergence of the scoop bucket, and should be terminated once the bucket has completely emerged out of the water.

The adjustment of the mouth can be easily effected by a sleeve projecting beyond the end of the suction pipe, whose position can be adjusted either through an opening which can be covered in a watertight manner, or from the outside.

Figure 2:
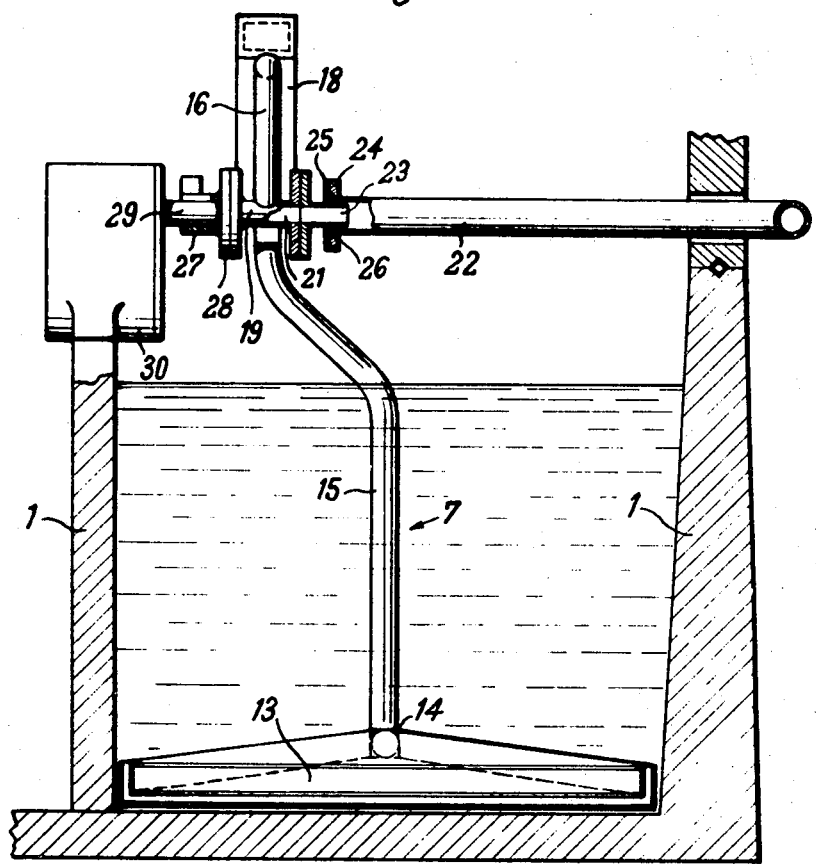

These and further objects, features and advantages of the present invention will become more apparent from the following description when taken in conjunction with the accompanying drawing which shows, for purposes of illustration only, one embodiment according to the present invention, and wherein:

FIG. 1 is a schematic longitudinal cross-sectional view through a waste water settling tank according to this invention with a horizontally disposed sludge remover; and FIG. 2 is a cross-sectional view of the settling tank with the sludge remover disposed vertically.

Referring now to the drawing wherein like reference numerals are used throughout the two views to designate like parts, a waste water purification tank 1 is illustrated in these figures which has a tank bottom of a semicircular shape. The tank 1 has an inlet at 3 shielded from the interior of the tank by a baffle plate 4 which, like the tank bottom 2, is adapted to the circular arc described by the outermost edge 5 of a sediment remover 7 rotatable about an axis 6.

The water entering at the inlet 3 slowly moves in the direction of the arrows 8 through the tank 1 and leaves by overflowing into a discharge channel or duct 12, after flowing through the outlet 9, which is again shielded from the interior of the tank by a correspondingly curved baffle plate 11. During the slow movement of the water through the tank 1, sludge is deposited on the bottom thereof. This sludge is removed from the tank from time to time by setting the sludge remover into rotation about the axis 6.

The sludge remover includes a scoope bucket 13 adapted to the width of the tank (FIG. 2); a suction pipe 15 is connected at the lowest point of the bottom 14 of the bucket, i.e., to that portion forming the bottom as the scoop bucket 13 emerges out of the water. This suction pipe 15 simultaneously serves as a mounting support for the scoop bucket 13, for the entire sludge remover is rotatably supported about the axis 6 with the aid of a particularly constructed connecting pipe 16 which, in the position of the sludge remover shown in FIG. 1, is connected at the highest point 17 of a collecting chamber 18; the suction pipe 15 likewise terminates in this collecting chamber 18.

The parts 19 and 21 (FIG. 2) constitute the rotating shaft of the connecting pipe 16 of the sludge remover. The part 21 is supported by extending into the tubularly shaped outlet channel 22. The end portion 23 of this part 21 is sealed in a flange 24 welded to the discharge duct 22, by means of a sealing ring 26 pressed thereagainst by a plate 25. The other part 19 of the connecting pipe 16 is flangedly connected to a flange 28 welded together with a sleeve 27, which is supported on a freely overhanging shaft end 29 of a schematically illustrated gear unit 30.

The suction pipe 15 extends into the collecting chamber 18 up to such a height that the mouth 31, in the position of the sludge remover shown in FIG. 1, is disposed approximately at the level of the upper edge 32 of the scoop bucket 13. A sleeve 33 is arranged about the mouth 31, which can be displaced in its longitudinal direction axially with respect to the mouth end of the suction pipe 15. The beginning of the siphoning operation can be set thereby within certain limits and can be adapted to the water level. The sleeve 33 can be adjusted by rotating the sleeve which is mounted on the suction pipe mouth by means of a thread; access to the sleeve 33 is gained through an opening sealed in a watertight manner by a correspondingly adapted plate 34. However, the sleeve 33 could also be adjusted from the outside, for example, by providing that it is slidingly seated on the mouth 31 and carries a rack engaged by a pinion which can be rotatably adjusted by a rod extending through the chamber 18 and by an adjusting wheel wedged onto the rod outside of the chamber 18.

If the sludge remover is set into rotation in such a manner that the scoop bucket 13 moves at a slow speed along the semicircular bottom 2 of the tank in a direction opposite to the arrows 8, then the remover cleans the tank bottom 2 from sludge deposited thereon. This sludge, in part, slides into the scoop bucket 13 and, in part, is pushed ahead of the scoop bucket by the latter. Once the sludge remover has arrived at the position illustrated in FIG. 1, the sludge is siphoned off from the bucket into the discharge pipe. This siphoning operation begins as soon as the mouth 31 of the suction pipe 15 is disposed below the water level. Upon the further rotation of the scoop bucket 13, the sludge which has entered the collecting chamber 18 flows, by way the connecting pipe 16 and part 21, into the drainage channel 22, which conducts the sludge or the like to further treatment.

It should additionally be noted that, in order to siphon off the sludge completely, the content of the collecting chamber, which should be almost fully immersed during the emerging of the scoop bucket, should be larger than the content of the scoop bucket in order to obtain the required suction effect.

While I have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What I claim is:

1. A tank for the purification of waste water with a sludge remover means slowly rotatable about an axis disposed above the waste water level and guided along a substantially semicircularly shaped tank bottom, characterized in that the sludge remover means includes a scoop means substantially matched to the width of the tank, and suction pipe means connected substantially to the lowest point of that portion of the scoop means forming the bottom thereof when the scoop means emerges out of the water, and simultaneously serving as support means for the scoop means to convey sediments from the tank bottom through the suction pipe means, during the rotation of the scoop means, to a discharge channel means disposed above the waste water level.

2. A tank with a sludge remover means according to claim 1, characterized in that the discharge channel means extends substantially coaxially to the axis of rotation of the sludge remover means.

3. A tank with a sludge remover means according to claim 2, characterized in that the suction pipe means terminates in a collecting chamber means disposed, during the emergence of the scoop means, substantially below the waste water level, and a connecting pipe means connected to the point of the chamber means which is highest at the instant of said emergence, said connecting pipe means simultaneously defining the axis of rotation for the sludge remover means.

4. A tank with a sludge remover means according to claim 3, characterized in that the parts of the connecting pipe means forming the axis of rotation for the sludge remover means are operatively connected, on the one hand, to a drive means and, on the other hand, are supported in the discharge channel means.

5. A tank according to claim 4, wherein said discharge channel means is tubularly shaped.

6. A tank with a sludge remover means according to claim 4, characterized in that the mouth of the suction pipe means terminating in the collecting chamber means is disposed, shortly prior to the emergence of the scoop means, at least approximately at the level thereof.

7. A tank with a sludge remover means according to claim 6, characterized in that the level of the mouth of the suction pipe means in the collecting chamber means is adjustable.

8. A tank according to claim 7, characterized in that the level of said mouth is adjustable by a sleeve means extending beyond the mouth.

9. A tank with a sludge remover means according to claim 7, characterized in that the height of the mouth of the suction pipe means in the collecting chamber means is adjustable through an opening provided therein and sealable in a watertight manner.

10. A tank according to claim 9, characterized by a sleeve means threadably mounted over the mouth of the suction pipe means to adjust the height of the latter by rotation of the sleeve means.

11. A tank with a sludge remover means according to claim 7, characterized in that the level of the mouth of the suction pipe means can be displaced, by axially shifting a sleeve means mounted over said mouth.

12. A tank according to claim 11, characterized by rack and pinion drive means connected with said sleeve means and operable by an adjusting wheel disposed outside of the collecting chamber means.

13. A tank with a sludge remover means according to claim 7, characterized in that the volume of the collecting chamber means corresponds at least approximately to the volume of the scoop means and of the suction pipe means.

14. A tank with a sludge remover means according to claim 1, characterized in that the suction pipe means terminates in a collecting chamber means disposed, during the emergence of the scoop means, substantially below the waste water level, and a connecting pipe means connected to the point of the chamber means which is highest at the instant of said emergence, said connecting pipe means simultaneously defining the axis of rotation for the sludge remover means.

15. A tank with a sludge remover means according to claim 14, characterized in that the parts of the connecting pipe means forming the axis of rotation for the sludge remover means are operatively connected, on the one hand, to a drive means and, on the other hand, are supported in the discharge channel means.

16. A tank according to claim 15, wherein said discharge channel means is tubularly shaped.

17. A tank with a sludge remover means according to claim 14, characterized in that the mouth of the suction pipe means terminating in the collecting chamber means is disposed, shortly prior to the emergence of the scoop means, at lest approximately at the level thereof.

18. A tank with a sludge remover means according to claim 17, characterized in that the level of the mouth of the suction pipe means in the collecting chamber means is adjustable.

19. A tank according to claim 18, characterized in that the level of said mouth is adjustable by a sleeve means extending beyond the mouth.

20. A tank with a sludge remover means according to claim 18, characterized in that the height of the mouth of the suction pipe means in the collecting chamber means is adjustable through an opening provided therein and sealable in a watertight manner.

21. A tank according to claim 20, characterized by a sleeve means threadably mounted over the mouth of the suction pipe means to adjust the height of the latter by rotation of the sleeve means.

22. A tank with a sludge remover means according to claim 18, characterized in that the level of the mouth of the suction pipe means can be displaced by axially shifting a sleeve means mounted over said mouth.

23. A tank with a sludge remover means according to claim 3, characterized in that the volume of the collecting chamber means corresponds at least approximately to the volume of the scoop means and of the suction pipe means.

* * * * *